Mar. 3, 1925.
P. H. GEYSER
1,528,052
AUTOMOBILE ROOF CONSTRUCTION
Filed Oct. 4, 1923
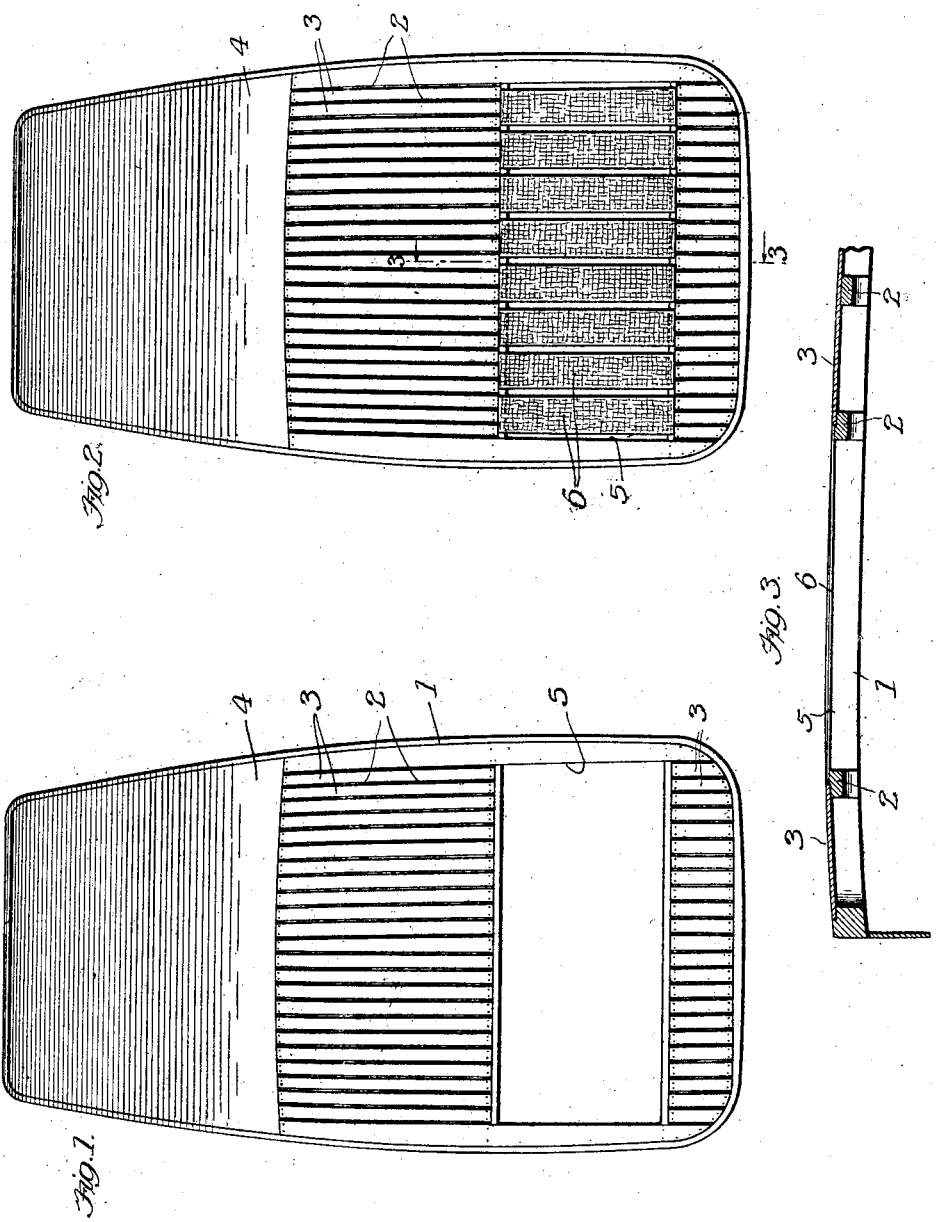

Patented Mar. 3, 1925.

1,528,052

UNITED STATES PATENT OFFICE.

PAUL HENRY GEYSER, OF CHICAGO, ILLINOIS, ASSIGNOR TO YELLOW CAB MANUFACTURING CO., OF CHICAGO, ILLINOIS, A CORPORATION OF MAINE.

AUTOMOBILE ROOF CONSTRUCTION.

Application filed October 4, 1923. Serial No. 666,588.

*To all whom it may concern:*

Be it known that I, PAUL H. GEYSER, a citizen of the United States of America, and a resident of Chicago, county of Cook, and State of Illinois, have invented a new and useful Improvement in Automobile Roof Constructions, of which the following is a specification.

The main objects of this invention are to provide an improved construction for non-collapsible tops for the bodies of motor vehicles; to provide a rigid non-collapsible roof construction having a portion thereof above the occupant's seat arranged so that, in the event the occupant is jolted upwardly against the roof, the shock will be cushioned to avoid personal injury, and to provide a roof construction of this kind which is similar in all outward appearances to the rigid roofs heretofore in use.

An illustrative embodiment of this invention is shown in the accompanying drawing, wherein—

Figure 1 is a top plan of the frame structure of a non-collapsible roof having a cut-out portion for the cushion section, the upholstery and top covering being omitted.

Fig. 2 is a view similar to Figure 1, but showing the cushion section inserted into the cut-out portion of the frame structure.

Fig. 3 is a transverse section taken on the line 3—3 of Fig. 2.

Automobiles of enclosed body design, such as those generally used in taxicab service, employ a rigid, non-collapsible roof or deck usually comprising a frame structure of wood covered with the customary padding and waterproof deck covering. Due to sudden jolting of the vehicle, passengers have been frequently thrown upwardly against the rigid roof and seriously injured.

The present invention provides a yielding section arranged within a rigid non-collapsible roof and located in such position above the occupant's seat that in the event of the occupants being jolted against the roof, the shock will be cushioned to avoid personal injury.

The specific form of vehicle top shown in the drawings, comprises a rigid frame structure 1 formed of the usual cross beams 2 and longitudinally extending slats 3 located above the passenger's compartment, and a solid panel 4 located above the driver's compartment.

Extending transversely across the roof frame structure and located directly above the rear or passenger seat of the vehicle, is a rectangular opening 5, in which the cushion section is arranged.

The specific form of cushion section herein shown comprises a plurality of spaced narrow fabric strips 6, of canvas web or the like, extending across the opening 5, and having their ends fastened to the upper side of the frame structure 1. The ends of the strips 6 are preferably tacked to the frame in such manner that they may be readily torn loose by an upward blow, as in the case of an occupant being jolted upwardly against the strips. The shock is thereby further cushioned so as to avoid injury to the occupant. Similar cushion sections may also be arranged above any other seats of the vehicle. The roof herein shown is particularly designed for use on taxicabs where the passengers usually occupy the rear seat. A cushion section above the driver's seat is not always essential because the driver is generally prepared for and anticipates the jolts, and he is in a position to brace himself against the steering wheel.

The usual upholstery which lines the lower side of the roof has been omitted from the drawings for the sake of clearness.

The operation of the invention is believed to be apparent from the foregoing description.

Although but one specific embodiment of this invention has been herein shown and described, it will be understood that some of the details of the construction shown may be altered or omitted without departing from the spirit of this invention as defined by the following claims.

I claim:

1. A motor vehicle roof comprising a rigid non-collapsible frame structure having an opening formed therein above the occupant's seat, a strip of fabric extending across said opening, and means for fastening the ends of said strip to said frame, said means being adapted to yield upon an upward blow against said strip.

2. A motor vehicle roof comprising a rigid non-collapsible frame structure having a rectangular opening formed therein above the occupant's seat, and a plurality of fabric strips extending across said opening to form a cushion section, the ends of said strips being nailed to the upper face of said frame structure and arranged to be torn from said frame by an upward blow against said strips.

Signed at Chicago this 1st day of October, 1923.

PAUL HENRY GEYSER.